Sept. 30, 1941.  H. G. KELLOGG  2,257,692
WINDSHIELD WIPER ARM
Filed Aug. 29, 1938
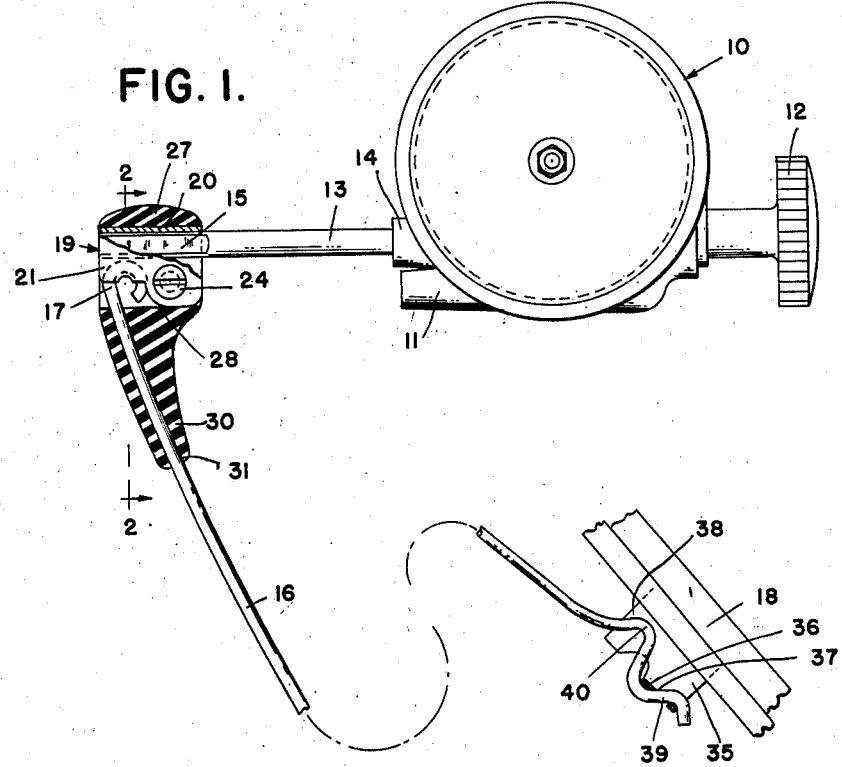
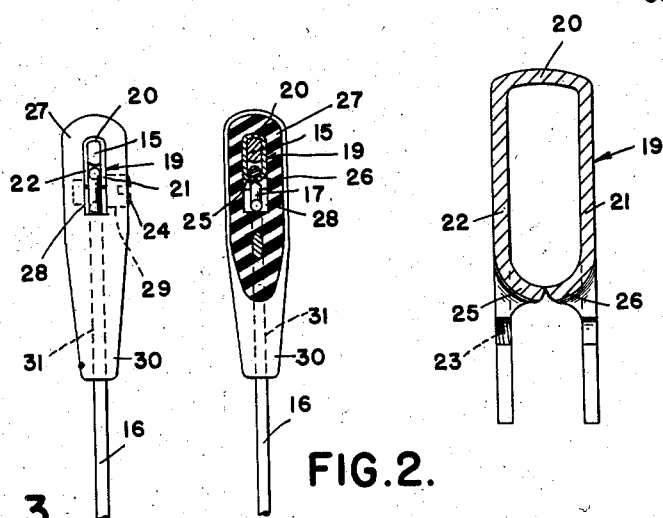
INVENTOR
HOMER G. KELLOGG
BY
ATTORNEYS Patented Sept. 30, 1941

2,257,692

UNITED STATES PATENT OFFICE 2,257,692

WINDSHIELD WIPER ARM

Homer G. Kellogg, Detroit, Mich., assignor to Motor Products Corporation, Detroit, Mich., a corporation of New York Application August 29, 1938, Serial No. 227,411

8 Claims. (Cl. 15—255)

The present invention relates to a wiper arm construction for a windshield wiper and more particularly to novel features of the same which provide for biasing the wiper arm toward the windshield and for providing a quickly detachable connection between the wiper arm and the wiper blade.

It is an object of the present invention to provide an improved device for interconnecting the wiper arm drive shaft and the wiper arm.

It is a further object of the invention to provide an extremely simple and efficient member for simultaneous clamping engagement with a wiper arm drive shaft and for detachably receiving a wiper arm in the biased relation.

It is a further object of the invention to provide a bracket for interconnecting a wiper arm drive shaft and a wiper arm in combination with a supporting body of resilient material which provides a biasing means for the wiper arm.

It is a further object of the present invention to provide for interconnecting a wiper arm drive shaft to a wiper arm, the wiper arm having one end bent to provide a supporting ring with which the means engages in detachable supporting relation.

Other objects of the invention will be apparent as the description proceeds and when taken in conjunction with the accompanying drawing, and wherein Fig. 1 is a view of a windshield cleaner assembly including the motor, the wiper blade and the parts interconnecting the same, with parts in section;

Fig. 2 is a section on the line 2—2 of Fig. 1;

Fig. 3 is a fragmentary end view of the wiper arm assembly shown in Fig. 1; and

Fig. 4 is a detail enlarged section of the bracket element taken on the line 2—2, Fig. 1.

A windshield wiper motor assembly is indicated at 10 in Fig. 1, comprising a casing adapted to be supported from a motor vehicle as by studs 11 and having a manual control valve 12 for controlling operation of the motor. A wiper arm drive shaft 13 is supported in a bushing 14 and is adapted to be oscillated through a predetermined arc by the motor means in a well known manner.

The wiper arm 13 is flattened at its free end, as indicated by the numeral 15 and as shown in Fig. 2.

A wiper arm 16 which preferably is formed of stiff wire is bent at one end to provide a substantially complete ring or eye 17. The wiper arm is adapted to support a wiper blade indicated at 18 in a manner subsequently to be described.

In order to provide for efficient cleaning of the windshield by oscillation of the wiper blade thereover, it is necessary for the wiper arm to be biased toward the windshield with a substantial force.

By my present construction I have provided an extremely simple and economical means for interconnecting the drive shaft and the wiper arm which provides for ready detachment of both elements and at the same time efficiently biases the wiper arm toward the windshield.

The interconnecting bracket takes the form substantially of a U-shaped sheet metal member, indicated generally at 19, which comprises a central web 20 and two substantially parallel flat arms 21 and 22. The space between the parallel arms 21 and 22 is slightly larger than the width of the flattened portion 15 of the wiper arm drive shaft, and the portion 15 of the wiper arm drive shaft is adapted to be clamped between arms 21 and 22.

In order to provide efficient clamping action, one of the arms, such as 22, is provided with a tapped aperture 23 for the reception of a clamping bolt 24. An aperture is provided in the arm 21 for free passage of the threaded portion of the bolt 24. As will be evident, the arrangement is such that upon turning the bolt 24, the arms 21 and 22 will be drawn together in clamping relation.

Other means are provided for supporting the wiper arm 16 in pivotal relation by means of the eye 17. These means take the form of opposed beads 25 and 26 carried by arms 22 and 21, respectively. As will be seen in Fig. 1, the bracket 19 is of substantial extent in the direction of the wiper arm drive shaft and being formed of resilient material the portions of the arms 21 and 22 carrying the beads 25 and 26 may be sprung apart slightly to permit the eye 17 to be brought into supported relation with the cooperating beads 25 and 26. For this purpose the clamping bolt 24 is loosened and subsequently tightened, as indicated in Fig. 3. Beads 25 and 26 are proportioned so that they abut through the aperture defined by the eye 17 with the result that the wiper arm 16 is substantially freely supported relative to the bracket 19.

Another important feature of my improved construction is the arrangement by which the arms 21 and 22 may be brought into tight clamping engagement with the flattened surface 15 of the drive shaft, although the beads 25 and 26 are in abutting engagement. This is due to the fact that beads 25 and 26 are spaced substantially from tapped aperture 23 so that after engagement of the beads 25 and 26 the bolt 24 may be further tightened to clamp the flattened portion 15 securely between the arms.

In order to provide means for biasing the wiper arm 16 toward the windshield, the bracket 19 is surrounded by and imbedded in a block 27 of resilient material. I have found that satisfactory results are obtained when the block 27 is formed of rubber, a soft and highly resilient rubber composition preferably being employed. The block of resilient material is provided with an aperture 28 for receiving and tightly embracing the bracket 19. It is further provided with a second aperture 29 communicating with aperture 28 for the reception of the head of the clamping bolt 24.

The block 27 is further provided with an elongated arm 30 which is adapted to engage the wiper arm and bias the same toward the windshield. Preferably the arm 30 is provided with a passage 31 extending longitudinally through and substantially aligned with the pivot point provided by the abutting beads 25 and 26. In addition, the passage 31 is in substantial alignment with the end opening of the aperture 28. This permits the wiper arm to be inserted into the passage 31 through the open end of the aperture 28.

In order to assemble the parts, the bolt 24 is slightly loosened and the wiper arm is drawn through the arm 30 until the eye 17 engages the beads 25 and 26. Since at this time, as previously described, the bolt 24 has been slightly loosened, the arms 21 and 22 may be sprung slightly apart in order to permit the eye 17 to come into guided engagement with the beads 25 and 26.

Due to the normal resiliency of the arm 30, the wiper arm 16 is biased toward the windshield by a predetermined force sufficient to insure efficient cleaning of the windshield.

The bracket 19 may now be slipped over the flattened portion 15 of the drive shaft 13 and clamped tightly thereto by turning the bolt 24. The wiper blade indicated at 18 has a bracket 35 rigidly secured thereto. This bracket comprises a short web portion 36 apertured as at 37 and interconnecting two arms 38, only one of which is shown in the drawing. The arms 38 extend substantially beyond the web 36 as shown.

The wiper arm 16 is provided adjacent its lower end with two reversed bends 39 and 40, the bend 39 being adjacent the end of the wiper arm and being of less depth than the bend 40. The bend 39 is provided for engagement with the bracket 35 and is adapted to be received within the aperture 37. The bend 40 which extends substantially further toward the wiper blade is received between the parallel arms 38 and is adapted to retain the blade 18 in substantial alignment with the wiper arm 16.

Since the blade 16 is constantly biased toward the windshield, the portion of the arm 16 intermediate bends 39 and 40 bears against the outside of the web 36. In order to detach the blade from the wiper arm, it is necessary only to draw the blade and the arm away from the windshield and to unhook the blade by a simple swinging movement about the reverse bend 39.

The construction just described provides an extremely efficient and economical means for interconnecting the wiper blade to a windshield motor. The device is characterized by its extreme simplicity and the ease with which the associated parts may be assembled and disassembled.

The foregoing detailed description has been given for clearness and understanding only and no unnecessary limitation should be understood therefrom.

What I claim as my invention is:

1. In a windshield wiper arm construction, a member having substantially parallel arms providing opposed flats for receiving the flattened end of an oscillatable shaft, means adjacent the ends of said arms for pivotally supporting a wiper arm, clamping means for causing said arms to approach for tightly clamping the end of said shaft, and an element formed of resilient material enveloping said member, said element having an apertured arm adapted to receive the wiper arm and to bias the arm toward a windshield.

2. In a windshield wiper arm construction, a member comprising a narrow web, flat arms of substantial width extending generally parallel from said web to receive therebetween the flattened end of a drive shaft, one of said arms having a tapped aperture and the other arm having a registering aperture, whereby said arms may be drawn together by a bolt, and a pair of opposed, registering beads on the inner sides of said arms, adapted to support a wiper arm for pivotal movement, said apertures and beads being laterally spaced whereby said arms may be tightly clamped upon a driving shaft irrespective of engagement of said beads.

3. In a windshield wiper arm construction, a member comprising a narrow web, flat arms of substantial width extending generally parallel from said web to receive therebetween the flattened end of a drive shaft, one of said arms having a tapped aperture and the other arm having a registering aperture, whereby said arms may be drawn together by a bolt, and a pair of opposed, registering beads on the inner sides of said arms adapted to support a wiper arm for pivotal movement, resilient material surrounding said member and having an arm extending therefrom, said arm being apertured in substantial alignment with said beads to receive a wiper arm and to bias the same toward a windshield.

4. In a windshield wiper arm construction, clamping means for simultaneously clamping upon the flattened end of a drive shaft and pivotally supporting a wiper arm, and resilient means carried by said clamping means for biasing a pivotally supported wiper arm in a predetermined manner, said resilient means comprising a block of resilient material surrounding said clamping means and having a hollow arm for receiving and biasing said wiper arm.

5. In a windshield wiper arm construction, clamping means for simultaneously clamping upon the squared end of a drive shaft and pivotally supporting a wiper arm, and resilient means carried by said clamping means for biasing a pivotally supported wiper arm in a predetermined manner, said resilient means comprising a block of resilient material surrounding said clamping means having a resilient arm apertured in substantial alignment with the point of pivotal support of said wiper arm.

6. In combination, a wiper arm having an aperture at one end, a support having means cooperating with said aperture to pivotally support said arm, a block of resilient material surrounding said support and having an arm surrounding said wiper arm adjacent said support, said arm biasing said wiper arm about its pivotal support.

7. In combination, a wiper arm having an aperture at one end, a support having opposed beads cooperating with said aperture to pivotally support said arm, a block of resilient material surrounding said support and having an arm surrounding and engaging said wiper arm adjacent said support and formed to bias said wiper arm toward a windshield, and means for drawing said beads into effective relation to said aperture.

8. In combination, a block of resilient material, a metallic U-shaped clamp embedded in said block and adapted to be clamped on a wiper arm drive shaft, said block having an integrally formed arm adapted to embrace a wiper arm, means in said clamp for pivotally supporting a wiper arm extending through said resiliently formed arm, said resiliently formed arm being shaped to bias said wiper arm toward a windshield when said clamp is clamped on a wiper arm drive shaft.

HOMER G. KELLOGG.